Patented Apr. 14, 1936

2,037,596

UNITED STATES PATENT OFFICE 2,037,596

WELDING ELECTRODE

Carl M. Schaub, Detroit, Mich.

No Drawing. Refiled for abandoned application Serial No. 510,062, January 20, 1931. This application March 29, 1934, Serial No. 717,955

5 Claims. (Cl. 219—8)

This invention relates to the art of welding and more particularly to an electrode of advantageous characteristics for use in electric arc welding.

Objects of my invention are to provide a welding electrode adapted to provide advantageous arc characteristics and to have excellent flowing properties particularly when melted by the metal arc method of welding. A further object is to provide such an electrode suitable for "vertical" and "overhead" welding, as well as for "flat" welding.

Further objects are to provide a ferrous welding electrode arranged to produce, when melted by the metal arc process, steel weld metal of relatively high tensile strength, high ductility, and high resistance to impact and fatigue.

Another object is to provide an arc welding electrode of advantageous characteristics for builing up worn surfaces, and which will produce hard and long-wearing, yet machineable, weld metal.

An additional object is to provide an arc welding electrode for welding steel, by means of which steel pieces may be joined to produce an article having practically the same strength characteristics as the parent metal.

Other objects of the invention will be apparent to those skilled in the art to which this invention appertains from the disclosures herein made.

By my invention I have provided a coated steel welding electrode, comprising a steel base rod associated with coating constituents including arc stabilizing and improving materials such that the resultant coated electrode will have a relatively high carbon content, relatively high manganese content and sufficient silicon content to impart a desirable degree of fluidity to the molten weld metal. I have found it preferable to have the major portion of the carbon, manganese, and silicon contents of the electrode provided by the coating constituents, since thereby the composition of the completed electrode may be more readily controlled, and furthermore the welding results are in general more satisfactory.

As a base rod for my electrode I employ preferably a low or medium carbon steel rod of good quality. I have found very satisfactory a rod having an analysis of 0.13 to 0.18 percent carbon, 0.40 to 0.60 per cent manganese, and 0.06 percent maximum silicon, impurities such as sulphur and phosphorus being of usual low content. This analysis will be recognized as being Specification E No. 1 B of the American Welding Society for arc welding electrodes. Rods of higher carbon content may be employed, but in view of the poorer welding properties of high carbon steel, I prefer to use rods having not more than 0.30 percent carbon. Rods having less than 0.13 percent carbon may be employed, but since rods of the 0.13 to 0.18 percent carbon range have satisfactory welding properties I prefer to have the somewhat higher content present.

The coating constituents are preferably in finely comminuted form, such as 100 mesh or finer, in order that said coating constituents may be more uniformly associated with the rod throughout the length thereof.

The carbon may be employed in any suitable form, but I have found very satisfactory the use of comminuted coke flour. In the finished electrode the carbon is preferably present in amount from 0.5 to 0.8 percent carbon. The greater the carbon content of the base rod, the less carbon will be employed in the coating, the limits given referring to the total of the carbon in the base rod and the carbon in the coating.

Manganese may be employed as a coating in a comminuted metallic form, such as pure manganese, ferro-manganese, or other suitable manganese alloy, or manganese in certain non-metallic forms may be employed, such as manganese dioxide. The total of the manganese content of the base rod and coating ranges preferably from 1.2 to 1.7 percent by weight. Where manganese in alloy or non-metallic compound form is employed the amount of alloy or compound used is based of course upon the manganese content thereof.

Silicon likewise may be employed in metallic or alloy form. Thus, metallic silicon or ferro-silicon may be satisfactorily employed. I have also found certain non-metallic silicon compounds such as silicon dioxide to be satisfactory for the purposes at hand. The total silicon content of the base rod together with that of the coating preferably ranges from 0.1 to 0.2 percent. This range of silicon has been found very satisfactory for metal arc welding in that the proper amount of fluidity is imparted to the molten weld metal and yet the metal is not so fluid as to inhibit the use of this electrode for vertical and overhead welding.

I have further found it desirable to associate with the above-mentioned coating ingredients certain fluxing and diluting materials which have the effect of permitting the relatively small percentage of alloying and coating ingredients to be more uniformly disseminated along the length of the electrode, and also of imparting certain desirable arc welding characteristics whereby the welding operation may be more easily and more advantageously carried on. For example, I have employed calcium carbonate and iron oxide very satisfactorily for this purpose in the coating, the calcium carbonate being present in the coating from 0.1 to 0.2 percent, and iron oxide from 0.01 to 0.03 percent, with respect to the weight of the entire coated electrode. Various other compounds may, of course, be employed for this purpose, such as fluorides and chlorides, halides in general, and many other compounds which will suggest themselves to those skilled in the art.

The coating materials may be caused to adhere to the base rod in any suitable manner. For example, a paste or suspension may be made of the coating materials and a binder, and the rod dipped in the paste or suspension, or the coating mixture may be applied to the rod by painting or any other suitable method. The coating may, of course, be applied to the outside of a metal rod or may form a core therefor, or may be disposed in pockets in the surface of the rod.

To illustrate by specific example the advantageous features of my improved electrode, a coating of the following composition was prepared:

| | Parts by weight |
|---|---|
| Ferro-manganese (80% manganese) of 200 mesh | 15.5 |
| Coke flour (200 mesh) | 15.5 |
| Ferro-silicon (50% silicon) | 6.75 |
| Calcium carbonate (powdered) | 6.75 |
| Iron oxide (powdered) | .75 |
| Water | 16.00 |
| Silicate of soda (commercial) | 9.90 |

0.64 grams of the above mixture were disposed uniformly on the exterior surface of a steel rod $\frac{3}{16}$ inch in diameter weighing 21.44 grams, by a brushing operation. The steel rod had a composition of 0.15 percent carbon, 0.50 percent manganese, and .06 percent silicon. The coating was then permitted to dry. After drying, the electrode was connected in an electric circuit for the metal arc welding process and melted in the electric arc using a direct current of 175 amperes.

Tests were then made to compare the strength of welds made with the coated electrode, and with the uncoated rod, and with fabrication steel. The fabrication steel employed for these tests was boiler plate having a composition of 0.13 percent carbon, 0.61 percent manganese and 0.05 percent silicon. Butt welds were made between pieces of such steel employing in one instance my improved coated electrode of the composition given in the specific example above, and employing the bare base rod of the composition specified in the above mentioned specific example. For the welding, direct current of about 175 amperes was employed, the rods or electrodes being melted by the metal arc process, the rod or electrode constituting one pole of the arc. Tensile specimens were made from the butt welded pieces, the test specimens being so shaped as to cause failure to occur in the weld. Tensile test specimens were also made of pieces of unwelded boiler plate.

The boiler plate developed an ultimate tensile strength of 61,500 pounds per square inch. The specimens made with my improved electrode failed in the weld, the weld developing a tensile strength of 60,000 pounds per square inch and an elongation of 15 percent in one inch. The specimens made employing the bare rod as an electrode failed also in the weld, the weld developing an ultimate tensile strength of 54,000 pounds per square inch and an elongation of 3.5 percent in one inch. The weld metal produced from my improved coated electrode had a scleroscope hardness of 36, as compared with a hardness of 24 for the boiler plate, and 19 for the weld formed from the bare rod. The weld metal produced from my coated electrode, though relatively hard, was still capable of being machined.

The chemical composition of the weld metal deposited from the coated electrode was 0.14 percent carbon, 0.70 percent manganese and 0.08 percent silicon, as compared with a composition of .13 percent carbon, 0.61 percent manganese and 0.05 percent silicon for the boiler plate, and 0.05 percent carbon and 0.30 percent manganese and a trace of silicon for the weld metal produced from the bare rod.

Other tests which have been made indicate the great superiority of welds formed from my improved electrode as regards resistance to impact and fatigue.

My invention has shown itself particularly adapted among other things for building up worn metal, such as worn car wheel flanges, and other worn metal members, where relative hardness and resistance to wear is desired but yet where a machineable surface is necessary.

It will be seen that I have provided an electrode by means of which steel fabrication of greatly improved characteristics with regard to strength and durability may be attained.

It will further be seen that I have provided an electrode capable of diverse uses in the metal arc welding field where strength, durability, and hardness are desirable.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

1. A welding electrode particularly adapted for the metal arc process of welding, comprising a steel base rod, and coating materials associated therewith comprising carbon, manganese, and silicon, the completed electrode having a total carbon content of from 0.5 to 0.8 percent, a manganese content of from 1.2 to 1.7 percent, a silicon content of from 0.1 to 0.2 percent, the major portion of said carbon, manganese and silicon contents being provided by the coating materials.

2. A welding electrode arranged for metal arc welding, comprising a steel base rod containing carbon from 0.13 to 0.18 percent, manganese from 0.40 to 0.6 percent, and .06 percent maximum silicon, and modifying materials comprising carbon, manganese and silicon, associated with the base rod in such a manner as to provide a flux during the welding operation, the completed electrode having a total carbon content of from 0.5 to 0.8 percent, a total manganese content of from 1.2 to 1.7 percent, and a silicon content of from 0.1 to 0.2 percent.

3. A welding electrode particularly adapted for metal arc welding, comprising a steel base rod, and a coating comprising carbon, manganese, silicon, iron oxide, and calcium carbonate, the completed electrode having a total carbon content of from 0.5 to 0.8 percent, a total manganese content of from 1.2 to 1.7 percent, a total silicon content of from 0.1 to 0.2 percent, iron oxide from 0.01 to 0.03 percent, and calcium carbonate from 0.1 to 0.2 percent.

4. An arc welding electrode comprising a steel base rod, and weld modifying material containing a substantial proportion of carbon, manganese and silicon associated with the base rod in such a manner that it will act as a flux during the welding operation, said weld modifying material containing a carbon in the form of coke flour, manganese as one of an arbitrary class composed of metallic manganese, ferro-manganese, and manganese dioxide, silicon as one of an arbitrary class composed of metallic silicon, ferro-silicon and silicon dioxide, the completed electrode having a carbon content ranging from 0.5 to 0.8 percent, a manganese content ranging from 1.2 to 1.7 percent, and a silicon content ranging from 0.1 to 0.2 percent.

5. A welding electrode comprising a low carbon steel rod, and a coating associated therewith, said coating containing about 44 parts by weight of ferro-manganese, about 15 parts by weight of coke flour, about 7 parts by weight of ferro-silicon, said coating being so proportioned in amount with respect to the base rod so that the finished electrode will have a composition of carbon from 0.5 to 0.8 percent, manganese from 1.2 to 1.7 percent, and silicon from 0.1 to 0.2 percent.

CARL M. SCHAUB.

CERTIFICATE OF CORRECTION.

Patent No. 2,037,596.　　　　　　　　　　　　　　　　　　April 14, 1936.

CARL M. SCHAUB.

It is hereby certified that error appears in the printed specification of the above numbered patent requiring correction as follows: Page 2, first column, line 29, for "15.5" read 44.35; and that the said Letters Patent should be read with this correction therein that the same may conform to the record of the case in the Patent Office.

Signed and sealed this 23rd day of June, A. D. 1936.

Leslie Frazer (Seal)　　　　　　　　　　　　　　　　　　Acting Commissioner of Patents.